US011882299B1

(12) United States Patent
Feng et al.

(10) Patent No.: US 11,882,299 B1
(45) Date of Patent: Jan. 23, 2024

(54) PREDICTIVE CONTRASTIVE REPRESENTATION METHOD FOR MULTIVARIATE TIME-SERIES DATA PROCESSING

(71) Applicant: NATIONAL UNIVERSITY OF DEFENSE TECHNOLOGY, Changsha (CN)

(72) Inventors: Yanghe Feng, Changsha (CN); Yulong Zhang, Changsha (CN); Longfei Zhang, Changsha (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 0 days.

(21) Appl. No.: 18/206,629

(22) Filed: Jun. 7, 2023

(30) Foreign Application Priority Data

Oct. 28, 2022 (CN) .......................... 202211331200.6

(51) Int. Cl.
*G06V 10/00* (2022.01)
*H04N 19/42* (2014.01)
(Continued)

(52) U.S. Cl.
CPC ........... *H04N 19/42* (2014.11); *H04N 19/132* (2014.11); *H04N 19/503* (2014.11); *H04N 19/85* (2014.11)

(58) Field of Classification Search
CPC ........ G06N 3/0464; G06N 3/08; G06N 3/084; G06N 3/086; G06N 3/091; G06N 3/02;
(Continued)

(56) References Cited

U.S. PATENT DOCUMENTS 10,198,011 B2 * 2/2019 DeBitetto ............ G01C 21/005
10,679,369 B2 * 6/2020 Hollander .............. G06V 10/22
(Continued)

FOREIGN PATENT DOCUMENTS

CN 111461455 A 7/2020
CN 111582571 A 8/2020
(Continued)

OTHER PUBLICATIONS

Li Chen, et al., Online Intention Recognition With Incomplete Information Based on a Weighted Contrastive Predictive Coding Model in Wargame, IEEE Transactions on Neural Networks and Learning Systems 2022, pp. 1-14.
(Continued)

*Primary Examiner* — Amir Alavi
(74) *Attorney, Agent, or Firm* — Bayramoglu Law Offices LLC (57) ABSTRACT

A predictive contrastive representation method for multivariate time-series data processing includes: mapping temporal coding information at a current moment and future situational information by using a logarithmic bilinear model to obtain a similarity; training the similarity according to a noise contrastive estimation method and prediction situational label data, and constructing, based on a training result, a predictive contrastive loss function of the temporal coding information at the current moment and the future situational information; sampling the prediction situational label data based on a corresponding optimal loss in the predictive contrastive loss function, optimizing the predictive contrastive loss function by using a direct proportion property between the sampling probability and the similarity, constructing mutual information between the temporal coding information at the current moment and the future situational information based on the optimized predictive (Continued)

contrastive loss function, and performing predictive contrastive representation by maximizing the mutual information.

9 Claims, 3 Drawing Sheets

(51) Int. Cl.
  *H04N 19/85* (2014.01)
  *H04N 19/503* (2014.01)
  *H04N 19/132* (2014.01)
(58) Field of Classification Search
  CPC ........ G06N 3/042; G06N 20/00; G06N 7/046; H04N 19/42; H04N 19/132; H04N 19/503; H04N 19/85; G06K 7/1482; G06K 9/0063; G06K 9/6202; G06T 3/4046; G06T 9/002; G06T 2207/20084; G06T 7/55; G06T 7/73; G06V 10/70; G05D 1/101; B64C 39/024
  See application file for complete search history.

(56) References Cited

U.S. PATENT DOCUMENTS

| | | | | |
|---|---|---|---|---|
| 11,163,321 | B1* | 11/2021 | Tang | G06N 3/049 |
| 11,308,603 | B2* | 4/2022 | Liu | G06T 7/0004 |
| 11,378,718 | B2* | 7/2022 | Phelan | G01W 1/10 |
| 11,513,515 | B2* | 11/2022 | Sudarsan | G05D 1/0027 |
| 2019/0011934 | A1* | 1/2019 | DeBitetto | G01C 21/005 |
| 2019/0107846 | A1* | 4/2019 | Roy | G08G 5/04 |
| 2020/0320274 | A1* | 10/2020 | Wang | H04N 19/176 |
| 2021/0221506 | A1* | 7/2021 | Phelan | G01S 13/89 |
| 2022/0014880 | A1* | 1/2022 | Lee | G01S 1/0423 |
| 2022/0121836 | A1* | 4/2022 | Dins | G05D 1/0676 |

FOREIGN PATENT DOCUMENTS

| | | |
|---|---|---|
| CN | 113299120 A | 8/2021 |
| CN | 113743509 A | 12/2021 |
| CN | 113793227 A | 12/2021 |

OTHER PUBLICATIONS

Zuandong Liu, et al., Prediction of unmanned aerial vehicle target intention under in-complete information, Scientia Sinica Informationis, 2020, pp. 704-717, vol. 50, Issue 5.

Liang Xing-Xing, et al., Sample Adaptive Policy Planning Based on Predictive Coding, Journal of Software, 2022, pp. 1477-1500, vol. 33, No. 4.

\* cited by examiner

PREDICTIVE CONTRASTIVE REPRESENTATION METHOD FOR MULTIVARIATE TIME-SERIES DATA PROCESSING

This application is based upon and claims priority to Chinese Patent Application No. 202211331200.6, filed on Oct. 28, 2022, the entire contents of which are incorporated herein by reference.

TECHNICAL FIELD

The present application relates to the field of data processing technologies, and in particular, to a predictive contrastive representation method for multivariate time-series data processing, a computer device and a storage medium.

BACKGROUND

The predictive comparative representation method is used to learn a feature extraction method that can effectively represent the time-series shared information of high-dimensional signals, while discarding redundant information and filtering noise. In modeling based on time series and high-dimensional data, through effective representation learning of features that can predict behavior, the low-dimensional features represented are more conducive to rapid decision-making, and are also used to deal with time-series vectors and image-based situations information, so that the code has the ability to synthesize situational information and predict situational development, and finally use it as prior knowledge for unmanned aerial vehicles (UAV) intelligent impending planning.

However, the current predictive comparative representation method ignores the temporal relationship in situational information, and its accuracy in predicting future situational information is relatively low.

SUMMARY

Based on the above technical problems, it is necessary to provide a predictive contrastive representation method for multivariate time-series data processing, a computer device and a storage medium, to improve the prediction accuracy of multivariate situational information.

A predictive contrastive representation method for multivariate time-series data processing includes:
  obtaining multivariate situational information historical data, where the multivariate situational information historical data includes coding situational data and prediction situational label data, and the prediction situational label data includes a positive sample and a negative sample;
  encoding the coding situational data by using a fully connected network and a convolutional neural network (CNN) to obtain single-frame coding information at a current moment;
  encoding the single-frame coding information based on a long short-term memory (LSTM) network and an attention mechanism network to obtain temporal coding information at the current moment;
  mapping the temporal coding information at the current moment and future situational information by using a logarithmic bilinear model to obtain a similarity between the temporal coding information at the current moment and the future situational information;
  training the similarity according to a noise contrastive estimation method and the prediction situational label data, and constructing, based on a training result, a predictive contrastive loss function for the temporal coding information at the current moment and the future situational information;
  sampling the prediction situational label data according to a corresponding optimal loss in the predictive contrastive loss function to obtain a sampling probability of the positive sample;
  optimizing the predictive contrastive loss function by using a direct proportion property between the sampling probability and the similarity to obtain an optimized predictive contrastive loss function; and
  constructing mutual information between the temporal coding information at the current moment and the future situational information based on the optimized predictive contrastive loss function, and performing predictive contrastive representation by maximizing the mutual information.

In an embodiment, the coding situational data includes a plurality of pieces of single-frame coding situational data; the single-frame coding situational data includes vectorial information and image-based information; and the step of encoding the coding situational data by using the fully connected network and the CNN to obtain the single-frame coding information includes:
  encoding the vectorial information by using the fully connected network to obtain single-frame vector coding information at the current moment;
  encoding the image-based coding information by using the CNN to obtain single-frame image-based coding information at the current moment; and
  splicing the single-frame vector coding information and the single-frame image-based coding information to obtain the single-frame coding information at the current moment.

In an embodiment, the step of mapping the temporal coding information at the current moment and the future situational information by using the logarithmic bilinear model to obtain the similarity between the temporal coding information at the current moment and the future situational information includes:
  mapping the temporal coding information at the current moment and the future situational information by using the logarithmic bilinear model to obtain the following similarity between the temporal coding information at the current moment and the future situational information:

$$f_k(s_{t+k}, c_t) = \exp(z_{t+k}^K W_k c_t)$$

where, $c_t$ denotes the temporal coding information at the current moment t, $s_{t+k}$ denotes the future situational information, $z_{t+k}^K$ denotes coding information of the future situational information, K denotes the number of moments, W denotes a weight coefficient matrix, and k denotes a serial number of the moment.

In an embodiment, the training result includes a correct similarity between the temporal coding information at the current moment and the future situational information in the positive sample and false similarities between the temporal coding information at the current moment and the future situational information in a plurality of negative samples; and the step of training the similarity according to the noise contrastive estimation method and the prediction situational label data, and constructing, based on the training result, the predictive contrastive loss function for the temporal coding information at the current moment and the future situational information includes:
  training the similarity according to the noise contrastive estimation method and the prediction situational label data, and constructing, based on the correct similarity and the plurality of false similarities, the predictive contrastive loss function for the temporal coding information at the current moment and the future situational information.

In an embodiment, the step of constructing, based on the correct similarity and the plurality of false similarities, the predictive contrastive loss function for the temporal coding information at the current moment and the future situational information includes:
  constructing, based on the correct similarity and the plurality of false similarities, the following predictive contrastive loss function for the temporal coding information at the current moment and the future situational information:

$$L_N = -E_S\left[\log \frac{f_k(s_{t+k}, c_t)}{\sum_{s_j \in S} f_k(s_j, c_t)}\right]$$

where, $(s_{t+k}, c_t)$ denotes a positive sample pair, $(s_j, c_t)$ denotes a negative sample pair, S denotes a total number of samples, $s_j$ denotes the negative sample, and E denotes an expected value.

In an embodiment, the step of sampling the prediction situational label data according to the corresponding optimal loss in the predictive contrastive loss function to obtain the sampling probability of the positive sample includes:
  sampling the prediction situational label data according to the corresponding optimal loss in the predictive contrastive loss function to obtain the following sampling probability of the positive sample:

$$p(d=i|S, c_t) == \frac{p(s_i|c_t)\prod_{l \ne i} p(s_l)}{\sum_{j=1}^{N} p(s_j|c_t)\prod_{l \ne j} p(s_l)} = \frac{\frac{p(s_i|c_t)}{p(s_i)}}{\sum_{j=1}^{N} \frac{p(s_j|c_t)}{p(s_j)}}$$

where, i denotes a serial number of the positive sample, j denotes a serial number of the negative sample, N denotes a total number of negative samples, $p(s_i|C_t)$ denotes a joint distribution probability of situational information $s_i$ in the positive sample and the temporal coding information $c_t$ at the current moment, $p(s_i)$ denotes an occurrence probability of the situational information $s_i$ in the positive sample, $p(s_j|c_t)$ denotes a joint distribution probability of situational information $s_j$ in the negative sample and the temporal coding information $c_t$ at the current moment, and $p(s_j)$ denotes an occurrence probability of situational information $s_j$ in the negative sample.

In an embodiment, the direct proportion property between the sampling probability and the similarity is:

$$f_k(s_{t+k}, c_t) \propto \frac{p(s_{t+k}|c_t)}{p(s_{t+k})}$$

where, $p(s_{t+k}|c_t)$ denotes a joint distribution probability of the future situational information $s_{t+k}$ and the temporal coding information $c_t$ at the current moment, and $p(s_{t+k})$ denotes an occurrence probability of the future situational information $s_{t+k}$.

In an embodiment, the step of optimizing the predictive contrastive loss function by using the direct proportion property between the sampling probability and the similarity to obtain the optimized predictive contrastive loss function includes:
  optimizing the predictive contrastive loss function by using the direct proportion property between the sampling probability and the similarity to obtain the following optimized predictive contrastive loss function:

$$\begin{aligned}L_N^{opt} &= -E_S\log\left[\frac{\frac{p(s_{t+k}|c_t)}{p(s_{t+k})}}{\frac{p(s_{t+k}|c_t)}{p(s_{t+k})} + \sum_{s_j \in S_{neg}} \frac{p(s_j|c_t)}{p(s_j)}}\right]\\ &= E_S\log\left[1 + \frac{p(s_{t+k})}{p(s_{t+k}|c_t)}\sum_{s_j \in S_{neg}} \frac{p(s_j|c_t)}{p(s_j)}\right]\\ &\approx E_S\log\left[1 + \frac{p(s_{t+k})}{p(s_{t+k}|c_t)}(N-1)E_{s_j}\frac{p(s_j|c_t)}{p(s_j)}\right]\\ &= E_S\log\left[1 + \frac{p(s_{t+k})}{p(s_{t+k}|c_t)}(N-1)\right]\\ &\ge E_S\log\left[\frac{p(s_{t+k})}{p(s_{t+k}|c_t)}N\right]\\ &= -I(s_{t+k}, c_t) + \log(N)\end{aligned}$$

where, $s_{neg}$ denotes a set of negative samples, and $I(s_{t+k}, c_t)$ denotes the mutual information between the temporal coding information at the current moment and the future situational information.

In an embodiment, the step of constructing the mutual information between the temporal coding information at the current moment and the future situational information based on the optimized predictive contrastive loss function includes:
  constructing the following mutual information between the temporal coding information at the current moment and the future situational information based on the optimized predictive contrastive loss function:

$$I(s_{t+k}, c_t) \ge \log(N) - L_N^{opt}.$$

A computer device is provided, including a memory and a processor, where the memory stores a computer program, and the computer program is executed by the processor to perform the following steps:
  obtaining multivariate situational information historical data, where the multivariate situational information historical data includes coding situational data and prediction situational label data, and the prediction situational label data includes a positive sample and a negative sample;
  encoding the coding situational data by using a fully connected network and a CNN to obtain single-frame coding information at a current moment;
  encoding the single-frame coding information based on an LSTM network and an attention mechanism network to obtain temporal coding information at the current moment;
  mapping the temporal coding information at the current moment and future situational information by using a logarithmic bilinear model to obtain a similarity between the temporal coding information at the current moment and the future situational information;

training the similarity according to a noise contrastive estimation method and the prediction situational label data, and constructing, based on a training result, a predictive contrastive loss function for the temporal coding information at the current moment and the future situational information;

sampling the prediction situational label data according to a corresponding optimal loss in the predictive contrastive loss function to obtain a sampling probability of the positive sample;

optimizing the predictive contrastive loss function by using a direct proportion property between the sampling probability and the similarity to obtain an optimized predictive contrastive loss function; and constructing mutual information between the temporal coding information at the current moment and the future situational information based on the optimized predictive contrastive loss function, and performing predictive contrastive representation by maximizing the mutual information.

A computer-readable storage medium storing a computer program is provided, where the computer program is executed by a processor to perform the following steps:

obtaining multivariate situational information historical data, where the multivariate situational information historical data includes coding situational data and prediction situational label data, and the prediction situational label data includes a positive sample and a negative sample;

encoding the coding situational data by using a fully connected network and a CNN to obtain single-frame coding information at a current moment;

encoding the single-frame coding information based on a long short-term memory (LSTM) network and an attention mechanism network to obtain temporal coding information at the current moment;

mapping the temporal coding information at the current moment and future situational information by using a logarithmic bilinear model to obtain a similarity between the temporal coding information at the current moment and the future situational information;

training the similarity according to a noise contrastive estimation method and the prediction situational label data, and constructing, based on a training result, a predictive contrastive loss function for the temporal coding information at the current moment and the future situational information;

sampling the prediction situational label data according to a corresponding optimal loss in the predictive contrastive loss function to obtain a sampling probability of the positive sample;

optimizing the predictive contrastive loss function by using a direct proportion property between the sampling probability and the similarity to obtain an optimized predictive contrastive loss function; and constructing mutual information between the temporal coding information at the current moment and the future situational information based on the optimized predictive contrastive loss function, and performing predictive contrastive representation by maximizing the mutual information.

According to the predictive contrastive representation method for multivariate time-series data processing, the computer device and the storage medium, this application achieves effective data downscaling and feature extraction of highly dynamic and high-dimensional situational information by using the fully connected network and the CNN. The feature extraction mechanism of the loss function, based on the LSTM network and the attention mechanism network in combination with maximization of the mutual information, can focus on processing multi-frame data, and the extracted feature information contains hidden information more favorable for future situational prediction, which improves the prediction accuracy of the future situational information.

DETAILED DESCRIPTION OF THE EMBODIMENTS

To make the objectives, technical solutions, and advantages of the present disclosure clearer, the present disclosure is further described in detail below with reference to the accompanying drawings and embodiments. It should be understood that the specific embodiments described herein are merely used to explain the present disclosure, rather than to limit the present disclosure.

Figure 1:
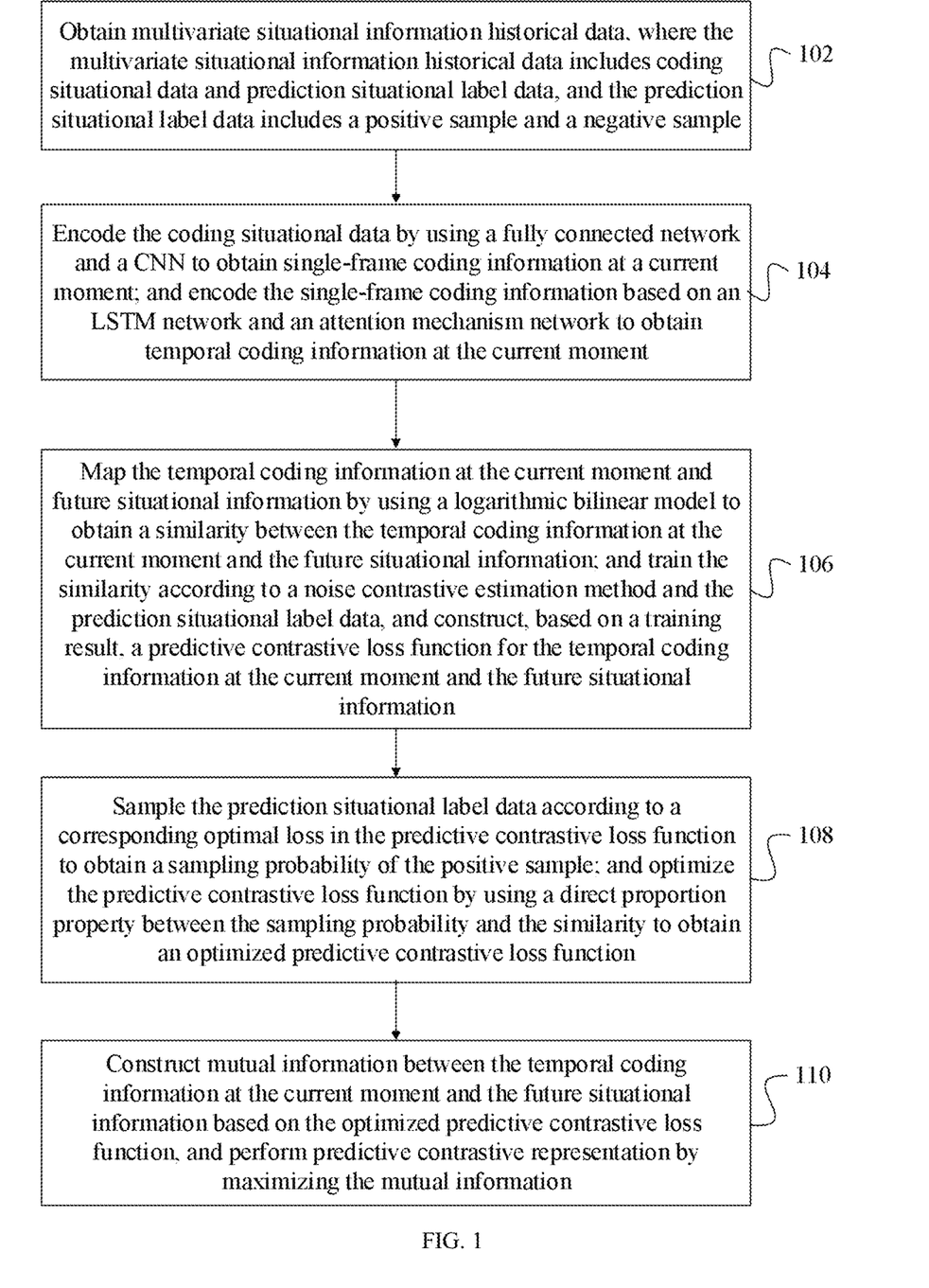
FIG. 1 is a schematic diagram of a predictive contrastive representation method for multivariate time-series data processing according to an embodiment.

In an embodiment, as shown in FIG. 1, a predictive contrastive representation method for multivariate time-series data processing includes the following steps:

Step 102: Multivariate situational information historical data is obtained, where the multivariate situational information historical data includes coding situational data and prediction situational label data, and the prediction situational label data includes a positive sample and a negative sample.

The multivariate situational information historical data is historical data generated by the UAV planning module in the mission-level confrontation platform; the situational information includes vectorial information, such as statistics feeding back the global progress and the number of UAVs and spots to be reconnoitered, or locations and status information of the UAVs and spots to be reconnoitered; and image-based information, such as real-time situational maps of the battlefield. It should be noted that some image-based information is also included, for example, grid information based on map rasterization, such as thermodynamic values of a target number of spots. The coding situational data is used to encode situational information at the current moment, the prediction situational label data represents the predictive feature correlation autoregressive loss used to calculate the multivariate situational information encoded in the temporal encoder, the positive sample in the prediction situational label data is a sample containing accurate prediction data, and the negative sample is a sample containing incorrect prediction data.

Step 104: The coding situational data is encoded by using a fully connected network and a CNN to obtain single-frame coding information at the current moment; and the single-frame coding information is encoded based on an LSTM network and an attention mechanism network to obtain temporal coding information at the current moment.

Figure 2:
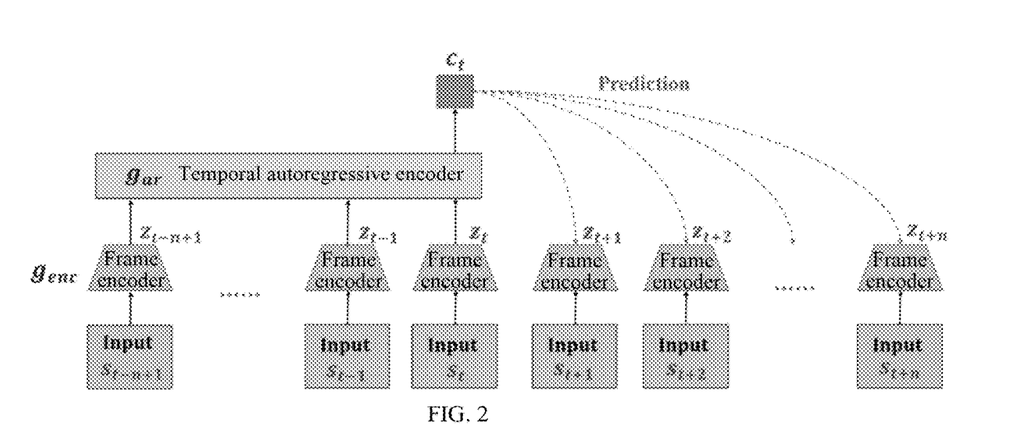
FIG. 2 is a structural framework diagram of predictive contrastive representation coding according to an embodiment.

As shown in FIG. 2, frame encoders in the figure include a single-frame vectorial encoder and an image-based information encoder, and is mainly configured to: perform feature coding on input high-dimensional situational information, extract effective coding information, and input the output coding information to the temporal autoregressive encoder. The high-dimensional situational information usually has two different data forms: one is high-dimensional vectorial frame data and the other is high-dimensional image frame data. When different situational frame data structures are input, different network frameworks need to be designed for the frame encoder module. Generally, the vectorial information in the situational data has a relatively simple design structure and can be directly encoded by using the fully connected network; if the input situational data is high-dimensional image frame data, a multilayer network structure based on the CNN can be used as the frame encoder, and the high-dimensional image frame input can be convolutionally pooled and downscaled layer by layer through multiple layers of CNN, to achieve feature extraction of the high-dimensional situational vectors. When the situational information includes both vectorial information and image-based information, the vectorial information coding network and image-based information coding network should be used to process the two types of information, and the generated vector coding and image coding should be spliced into single-frame coding information. The frame encoder achieves effective data dimension reduction and feature extraction for the highly dynamic and high-dimensional situational information, facilitating subsequent prediction.

In the figure, the LSTM network is used as the temporal regression autoencoder, the LSTM network uses the output layer information to predict the future situational data, and the hidden layer information is used as the situational coding with predictive cognition of the future situation after the network training is completed. Through the fitting of attention mechanism network, the importance of a plurality of pieces of historical situational coding information in the coding information at the current moment is reflected, and the time-series information of hidden information that is more conducive to future situational prediction is extracted, thus improving the prediction accuracy of the future situational data.

Step 106: The temporal coding information at the current moment and the future situational information are mapped by using a logarithmic bilinear model to obtain a similarity between the temporal coding information at the current moment and the future situational information; and the similarity is trained according to a noise contrastive estimation method and the prediction situational label data, and a predictive contrastive loss function for the temporal coding information at the current moment and the future situational information is constructed based on a training result.

The similarity is trained according to the noise contrastive estimation method and the prediction situational label data, and the predictive contrastive loss function for the temporal coding information at the current moment and the future situational information is constructed by using a correct similarity and a plurality of false similarities. The mutual information between the future situational information and the temporal coding information at the current moment is made larger by continuously reducing the loss function. The mutual information is essentially used to represent the correlation between two variables, to increase the accuracy of predicting the future situational data based on the temporal coding information at the current moment Step 108: The prediction situational label data is sampled according to a corresponding optimal loss in the predictive contrastive loss function to obtain a sampling probability of the positive sample; and the predictive contrastive loss function is optimized by using a direct proportion property between the sampling probability and the time-series correlation to obtain the optimized predictive contrastive loss function.

The corresponding optimal loss in the predictive contrastive loss function indicates that the result is the exact result, that is, the positive sample, when predicting the future situational information based on the temporal coding information at the current moment, and then the prediction situational label data is sampled to obtain the sampling probability of the positive sample. The predictive contrastive loss function is optimized by using the direct proportion property between the sampling probability and the similarity, and the predictive contrastive loss function is constructed based on the probability of the future real data and the random sampling data, such that the optimized predictive contrastive loss function can be used to represent the mutual information between the future situational information and the temporal coding information at the current moment, and thus used for prediction of the future situational information.

Step 110: The mutual information between the temporal coding information at the current moment and the future situational information is constructed according to the optimized predictive contrastive loss function, and the predictive contrastive representation is performed by maximizing the mutual information.

In order to better predict the situational information, this application encodes the future situational information and the temporal coding information at the current moment into a compact distributed vector through linear or nonlinear learning mapping, and effectively predicts the future information by maximizing the mutual information between the future situational information and the temporal coding information at the current moment. The mutual information is essentially used to represent the correlation between two variables. Maximizing the mutual information minimizes the uncertainty of the future situational information by fully learning the temporal coding information at the current moment, which improves the prediction effect.

According to the predictive contrastive representation method for multivariate time-series data processing, this application achieves effective data downscaling and feature extraction of highly dynamic and high-dimensional situational information by using the fully connected network and the CNN. The feature extraction mechanism of the loss function, based on the LSTM network and the attention mechanism network in combination with maximization of the mutual information, can focus on processing multi-frame data, and the extracted feature information contains hidden information more favorable for future situational prediction, which improves the prediction accuracy of the future situational information.

In an embodiment, the coding situational data includes a plurality of pieces of single-frame coding situational data;

the single-frame coding situational data includes vectorial information and image-based information; and the step of encoding the coding situational data by using the fully connected network and the CNN to obtain the single-frame coding information includes:
    encoding the vectorial information by using the fully connected network to obtain single-frame vector coding information at the current moment;
    encoding the image-based coding information by using the CNN to obtain single-frame image-based coding information at the current moment; and
    splicing the single-frame vector coding information and the single-frame image-based coding information to obtain the single-frame coding information at the current moment.

In an embodiment, the step of mapping the temporal coding information at the current moment and the future situational information by using the logarithmic bilinear model to obtain the similarity between the temporal coding information at the current moment and the future situational information includes:
    mapping the temporal coding information at the current moment and the future situational information by using the logarithmic bilinear model to obtain the following similarity between the temporal coding information at the current moment and the future situational information:

$$f_k(s_{t+k}, c_t) = \exp(z_{t+k}^K W_k c_t)$$

where, $c_t$ denotes the temporal coding information at the current moment t, $s_{t+k}$ denotes the future situational information, $z_{t+k}^K$ denotes coding information of the future situational information, K denotes the number of moments, W denotes a weight coefficient matrix, and k denotes a serial number of the moment.

In a specific embodiment, the temporal coding information at the current moment and the future situational information are mapped by using the logarithmic bilinear model. Specifically, the weight coefficient matrix $W_1, W_2, \ldots, W_k$ is multiplied by $c_t$ as the prediction value (that is, $W_k c_t$), $z_{t+k}^K$ is a true value, and the vector inner product is used to measure the similarity, such that the following function is obtained to approximate the density ratio:

$$f_k(s_{t+k}, c_t) = \exp(z_{t+k}^K W_k c_t)$$

In an embodiment, the training result includes a correct similarity between the temporal coding information at the current moment and the future situational information in the positive sample and false similarities between the temporal coding information at the current moment and the future situational information in a plurality of negative samples; and the step of training the similarity according to the noise contrastive estimation method and the prediction situational label data, and constructing, based on the training result, the predictive contrastive loss function for the temporal coding information at the current moment and the future situational information includes:
    training the similarity according to the noise contrastive estimation method and the prediction situational label data, and constructing, based on the correct similarity and the plurality of false similarities, the predictive contrastive loss function for the temporal coding information at the current moment and the future situational information.

In an embodiment, the step of constructing, based on the correct similarity and the plurality of false similarities, the predictive contrastive loss function for the temporal coding information at the current moment and the future situational information includes:
    constructing, based on the correct similarity and the plurality of false similarities, the following predictive contrastive loss function for the temporal coding information at the current moment and the future situational information:

$$L_N = -\mathop{E}_{S}\left[\log \frac{f_k(s_{t+k}, c_t)}{\sum_{s_j \in S} f_k(s_j, c_t)}\right]$$

where, $(s_{t+k}, c_t)$ denotes a positive sample pair, $(s_j, c_t)$ denotes a negative sample pair, s denotes a total number of samples, $s_j$ denotes the negative sample, and E denotes an expected value.

In a specific embodiment, the positive sample is a sample of k steps away from the current $c_t$; the negative samples are samples selected randomly in sequence. In order to optimize the loss, it is desired that the numerator be as large and the denominator as small as possible. This is consistent with the requirement for the mutual information between s and c, that is, greater mutual information between positive sample pairs indicates smaller mutual information between negative sample pairs. Optimizing the loss is maximizing the mutual information between $s_{t+k}$ and $c_t$.

In an embodiment, the step of sampling the prediction situational label data according to the corresponding optimal loss in the predictive contrastive loss function to obtain the sampling probability of the positive sample includes:
    sampling the prediction situational label data according to the corresponding optimal loss in the predictive contrastive loss function to obtain the following sampling probability of the positive sample:

$$p(d=i \mid S, c_t) = \frac{p(s_i|c_t)\prod_{l \neq i} p(s_l)}{\sum_{j=1}^{N} p(s_j|c_t)\prod_{l \neq j} p(s_l)} = \frac{\frac{p(s_i|c_t)}{p(s_i)}}{\sum_{j=1}^{N} \frac{p(s_j|c_t)}{p(s_j)}}$$

where, i denotes a serial number of the positive sample, j denotes a serial number of the negative sample, N denotes a total number of negative samples, $p(s_i|c_t)$ denotes a joint distribution probability of situational information $s_i$ in the positive sample and the temporal coding information $c_t$ at the current moment, $p(s_i)$ denotes an occurrence probability of the situational information $s_i$ in the positive sample, $p(s_j|c_t)$ denotes a joint distribution probability of situational information $s_j$ in the negative sample and the temporal coding information $c_t$ at the current moment, and $p(s_j)$ denotes an occurrence probability of situational information $s_j$ in the negative sample.

In a specific embodiment, the optimal loss is considered, it is assumed that $s_i$ is a predicted result of $c_t$, that is, the positive sample. In this case, the probability of $s_i$ being sampled is:

$$p(d=i \mid S, c_t) = \frac{p(s_i|c_t)\prod_{l \neq i} p(s_l)}{\sum_{j=1}^{N} p(s_j|c_t)\prod_{l \neq j} p(s_l)} = \frac{\frac{p(s_i|c_t)}{p(s_i)}}{\sum_{j=1}^{N} \frac{p(s_j|c_t)}{p(s_j)}}$$

This is in fact the optimal output result of $f_k(s_i, c_t)$, thus $f_k(s_{t+k}, c_t)$ is in direct proportion to $$\frac{p(s_{t+k}|c_t)}{p(s_{t+k})},$$

and is independent of the number N−1 of negative samples selected. The sample set S includes positive samples $s_{t+k}$ and negative samples $s_{neg}$, the predictive contrastive loss function is optimized based on the direct proportion relationship between $$f_k(s_{t+k}, c_t) \text{ and } \frac{p(s_{t+k}|c_t)}{p(s_{t+k})}.$$

In an embodiment, the direct proportion property between the sampling probability and the similarity is:

$$f_k(s_{t+k}, c_t) \propto \frac{p(s_{t+k}|c_t)}{p(s_{t+k})}$$

where, $p(s_{t+k}|c_t)$ denotes a joint distribution probability of the future situational information $s_{t+k}$ and the temporal coding information Cr at the current moment, and $p(s_{t+k})$ denotes an occurrence probability of the future situational information $s_{t+k}$.

In an embodiment, the step of optimizing the predictive contrastive loss function by using the direct proportion property between the sampling probability and the similarity to obtain the optimized predictive contrastive loss function includes:

optimizing the predictive contrastive loss function by using the direct proportion property between the sampling probability and the similarity to obtain the following optimized predictive contrastive loss function:

$$L_N^{opt} = -E_S \log\left[\frac{\frac{p(s_{t+k}|c_t)}{p(s_{t+k})}}{\frac{p(s_{t+k}|c_t)}{p(s_{t+k})} + \sum_{s_j \in S_{neg}} \frac{p(s_j|c_t)}{p(s_j)}}\right]$$

$$= E_S \log\left[1 + \frac{p(s_{t+k})}{p(s_{t+k}|c_t)} \sum_{s_j \in S_{neg}} \frac{p(s_j|c_t)}{p(s_j)}\right]$$

$$\approx E_S \log\left[1 + \frac{p(s_{t+k})}{p(s_{t+k}|c_t)}(N-1)E_{s_j}\frac{p(s_j|c_t)}{p(s_j)}\right]$$

$$= E_S \log\left[1 + \frac{p(s_{t+k})}{p(s_{t+k}|c_t)}(N-1)\right]$$

$$\geq E_S \log\left[\frac{p(s_{t+k})}{p(s_{t+k}|c_t)}N\right]$$

$$= -I(s_{t+k}, c_t) + \log(N)$$

where, $s_{neg}$ denotes a set of negative samples, and $I(s_{t+k}, c_t)$ denotes the mutual information between the temporal coding information at the current moment and the future situational information.

In an embodiment, the step of constructing the mutual information between the temporal coding information at the current moment and the future situational information based on the optimized predictive contrastive loss function includes:

constructing the following mutual information between the temporal coding information at the current moment and the future situational information based on the optimized predictive contrastive loss function:

$$I(s_{t+k}, c_t) \geq \log(N) - L_N^{opt}.$$

In a specific embodiment, maximizing the mutual information is the training $\mathcal{L}$ objective, and minimizing the loss function $\mathcal{L}_N^{opt}$ is essentially maximizing the lower bound of the mutual information between $s_{t+k}$ and $c_t$, that is, minimizing the loss function can maximize the lower bound of the mutual information between $s_{t+k}$ and $c_t$. In addition, a larger N indicates a more accurate estimation value in the third step in the optimized predictive contrastive loss function. Increasing the number of sampled N can also increase the lower bound of $I(s_{t+k}, c_t)$, that is, increasing the number of negative samples is also a way to improve data preprocessing effect.

Figure 3:
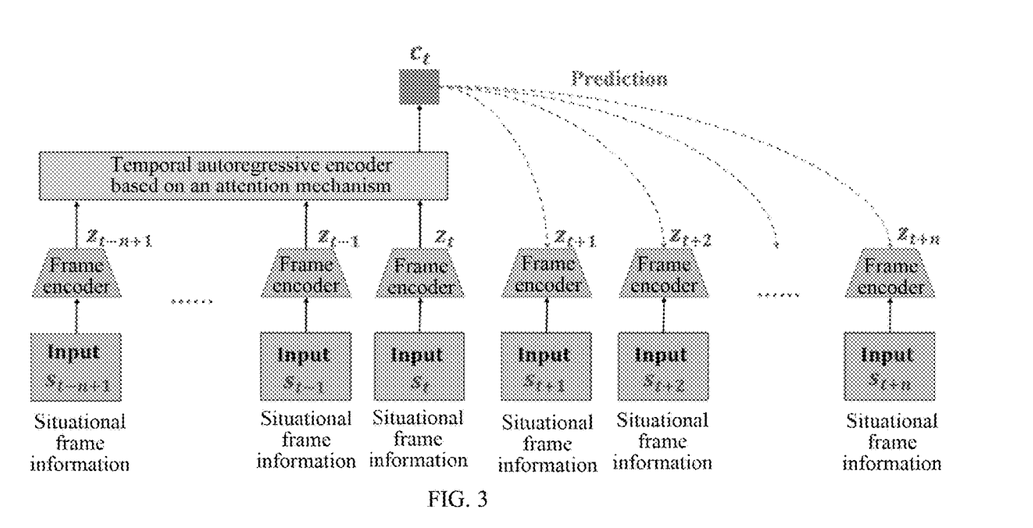
FIG. 3 is a structural framework diagram of predictive contrastive representation coding based on an attention mechanism autoregressive temporal encoder according to an embodiment.

In an embodiment, as shown in FIG. 3, the temporal autoregressive encoder needs to perform temporal correlation processing on multiple frames of coding information with temporal correlation, and therefore a temporal autoregressive encoder based on the attention mechanism network is designed in this application. The attention mechanism network is essentially used to select information related to a specific task from n input vectors $[s_1, \ldots, s_n]$ and assign corresponding weight information to it. In the attention mechanism, the correlation between each input vector and query vector is calculated with a scoring function by introducing a representation related to the task performed, referred to as the query vector. A query vector q related to the task is given, and an attention variable z E $\{1,2, \ldots, n\}$ is used to indicate the index position of the selected information, where n is a positive integer. That is, z=j indicates that the jth input vector is selected.

Figure 4:
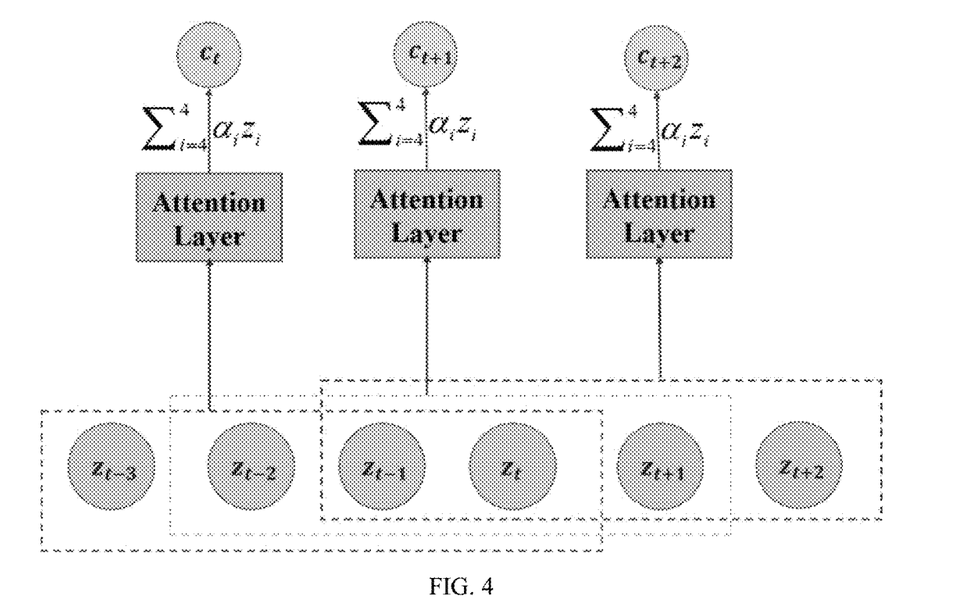
FIG. 4 is a schematic flowchart of autoregressive temporal coding based on the attention mechanism according to another embodiment.

As shown in FIG. 4, the attention vector $c_t$ in the attention mechanism network is calculated as follows:

$$c_t = \sum_{i=1}^{n} \alpha_i z_{t-i}$$

$$\alpha_i = \frac{\exp(\tilde{\alpha}_i)}{\sum_{j=1}^{n} \exp(\tilde{\alpha}_i)}$$

$$\tilde{\alpha}_i = W * z_{t-i} + b$$

where, W, b are coefficients of the weight and bias of the attention network, and $\alpha_i$ fitted by the attention network reflects the importance of a plurality of pieces of historical situational coding information $z_i$ in the vector $c_t$.

The predictive contrastive representation coding achieves effective data downscaling and feature extraction of highly dynamic and high-dimensional situational information by using the fully connected network and the CNN, and the feature extraction mechanism of the loss function, based on the LSTM network and the attention mechanism network in combination with maximization of the mutual information, can focus on processing multi-frame data, and the extracted feature information contains hidden information more favorable for future situation prediction, which improves the prediction accuracy of the future situational information.

It should be understood that although the steps in the flowchart of FIG. 1 are sequentially displayed according to the arrows, these steps are not necessarily performed in the order indicated by the arrows. Unless clearly described otherwise, the execution order of the steps is not strictly limited, and these steps may be executed in other orders. Moreover, at least some of the steps in FIG. 1 may include a plurality of sub-steps or stages. The sub-steps or stages are not necessarily executed at the same time, but may be executed at different times. The execution order of the sub-steps or stages is not necessarily carried out sequentially, but may be executed alternately with other steps or at least some of the sub-steps or stages of other steps.

Figure 5:
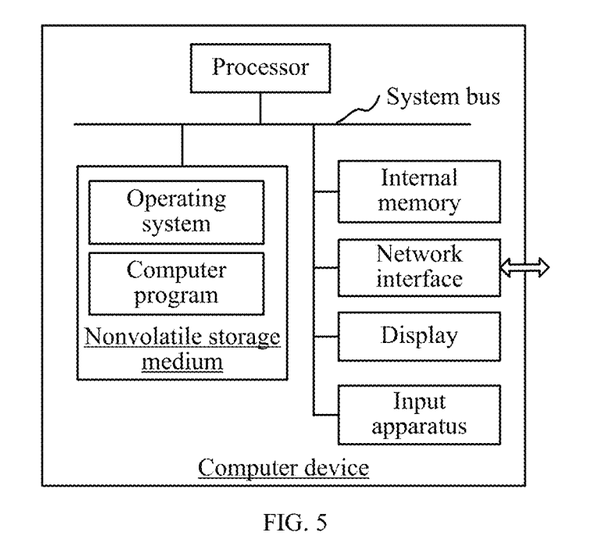
FIG. 5 is an internal structural diagram of a computer device according to an embodiment.

In an embodiment, a computer device is provided. The computer device may be a terminal, and an internal structure thereof may be as shown in FIG. 5. The computer device includes a processor, a memory, a network interface, a display, and an input apparatus which are connected through a system bus. The processor of the computer device is configured to provide calculation and control capabilities. The memory of the computer device includes a nonvolatile storage medium and an internal memory. The nonvolatile storage medium stores an operating system and a computer program. The internal memory provides an environment for operation of the operating system and the computer program in the nonvolatile storage medium. The network interface of the computer device is configured to communicate with an external terminal through a network. The computer program is executed by the processor in order to implement a predictive contrastive representation method for multivariate time-series data processing. The display of the computer device may be an LCD or an e-ink display; the input apparatus of the computer device may be a touch layer covering the display, a key, a trackball or a touchpad set on a housing of the computer device, an external keyboard, touchpad or mouse, or the like.

Those skilled in the art may understand that the structure shown in FIG. 5 is only a block diagram of a part of the structure related to the solution of the present disclosure and does not constitute a limitation on a computer device to which the solution of the present disclosure is applied. Specifically, the computer device may include more or less components than those shown in the figure, or combine some components, or have different component arrangements.

In an embodiment, a computer device is provided, including a memory and a processor, where the memory stores a computer program, and the computer program is executed by the processor to implement the steps of the methods in the above embodiments.

In an embodiment, a computer storage medium is provided. The computer-readable storage medium stores a computer program, and the computer program is executed by a processor to implement the steps of the methods in the above embodiments.

Those of ordinary skill in the art may understand that all or some of the procedures in the methods of the above embodiments may be implemented by a computer program instructing related hardware. The computer program may be stored in a nonvolatile computer-readable storage medium. When the computer program is executed, the procedures in the embodiments of the above methods may be performed. Any reference to a memory, storage, database or other medium used in the various embodiments of the present disclosure may include a non-volatile and/or volatile memory. The nonvolatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As description rather than limitation, the RAM can be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a Rambus direct RAM (RDRAM), a direct Rambus dynamic RAM (DRDRAM), and a Rambus dynamic RAM (RDRAM).

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

Only several implementations of the present application are described in detail in the above embodiments, but they should not therefore be construed as limiting the scope of the present disclosure. It should be noted that those of ordinary skill in the art can further make variations and improvements without departing from the conception of the present application. These variations and improvements all fall within the protection scope of the present application. Therefore, the protection scope of the present disclosure should be subject to the protection scope defined by the claims.

What is claimed is:

1. A predictive contrastive representation method for multivariate time-series data processing, comprising:
   obtaining multivariate situational information historical data, wherein the multivariate situational information historical data comprises coding situational data and prediction situational label data, and the prediction situational label data comprises a positive sample and a negative sample; the multivariate situational information historical data is historical data generated by unmanned aerial vehicles UAVs in a mission-level confrontation platform; the coding situational data is used to encode situational information at a current moment; the prediction situational label data represents a predictive feature correlation autoregressive loss used to calculate the multivariate situational information encoded in a temporal encoder; the situational information comprises statistics of a number of UAVs and spots to be reconnoitered, or locations and status information of the UAVs and the spots to be reconnoitered;
   encoding the coding situational data by using a fully connected network and a convolutional neural network (CNN) to obtain single-frame coding information at the current moment;
   encoding the single-frame coding information based on a long short-term memory (LSTM) network and an attention mechanism network to obtain temporal coding information at the current moment:
   mapping the temporal coding information at the current moment and future situational information by using a logarithmic bilinear model to obtain a similarity between the temporal coding information at the current moment and the future situational information;
   training the similarity according to a noise contrastive estimation method and the prediction situational label data, and constructing, based on a training result, a predictive contrastive loss function for the temporal coding information at the current moment and the future situational information;

sampling the prediction situational label data according to a corresponding optimal loss in the predictive contrastive loss function to obtain a sampling probability of the positive sample;

optimizing the predictive contrastive loss function by using a direct proportion property between the sampling probability and the similarity to obtain an optimized predictive contrastive loss function; and constructing mutual information between the temporal coding information at the current moment and the future situational information based on the optimized predictive contrastive loss function, and performing predictive contrastive representation by maximizing the mutual information; wherein performing predictive contrastive representation by maximizing the mutual information comprises:

predicting future information by maximizing the mutual information between the future situational information and the temporal coding information at the current moment.

2. The predictive contrastive representation method according to claim 1, wherein the coding situational data comprises a plurality of pieces of single-frame coding situational data; the single-frame coding situational data comprises vectorial information and image-based information; and the step of encoding the coding situational data by using the fully connected network and the CNN to obtain the single-frame coding information comprises:

encoding the vectorial information by using the fully connected network to obtain single-frame vector coding information at the current moment;

encoding the image-based coding information by using the CNN to obtain single-frame image-based coding information at the current moment; and splicing the single-frame vector coding information and the single-frame image-based coding information to obtain the single-frame coding information at the current moment.

3. The predictive contrastive representation method according to claim 1, wherein the step of mapping the temporal coding information at the current moment and the future situational information by using the logarithmic bilinear model to obtain the similarity between the temporal coding information at the current moment and the future situational information comprises:

mapping the temporal coding information at the current moment and the future situational information by using the logarithmic bilinear model to obtain the following similarity between the temporal coding information at the current moment and the future situational information:

$$f_k(s_{t+k}, c_t) = \exp(z_{t+k}^K W_k c_t)$$

wherein $c_t$ denotes the temporal coding information at the current moment t, $s_{t+k}$ denotes the future situational information, $z_{t+k}^K$ denotes coding information of the future situational information, K denotes a number of moments, W denotes a weight coefficient matrix, and k denotes a serial number of a moment.

4. The predictive contrastive representation method according to claim 3, wherein the training result comprises a correct similarity between the temporal coding information at the current moment and the future situational information in the positive sample and a plurality of false similarities between the temporal coding information at the current moment and the future situational information in a plurality of negative samples; and the step of training the similarity according to the noise contrastive estimation method and the prediction situational label data, and constructing, based on the training result, the predictive contrastive loss function for the temporal coding information at the current moment and the future situational information comprises:

training the similarity according to the noise contrastive estimation method and the prediction situational label data, and constructing, based on the correct similarity and the plurality of false similarities, the predictive contrastive loss function for the temporal coding information at the current moment and the future situational information.

5. The predictive contrastive representation method according to claim 4, wherein the step of constructing, based on the correct similarity and the plurality of false similarities, the predictive contrastive loss function for the temporal coding information at the current moment and the future situational information comprises:

constructing, based on the correct similarity and the plurality of false similarities, the following predictive contrastive loss function for the temporal coding information at the current moment and the future situational information:

$$L_N = -\mathop{E}_{S}\left[\log \frac{f_k(s_{t+k}, c_t)}{\sum_{s_j \in S} f_k(s_j, c_t)}\right]$$

wherein $(s_{t+k}, c_t)$ denotes a positive sample pair, $(s_j, c_t)$ denotes a negative sample pair, s denotes a total number of samples, $s_j$ denotes the negative sample, and E denotes an expected value.

6. The predictive contrastive representation method according to claim 5, wherein the step of sampling the prediction situational label data according to the corresponding optimal loss in the predictive contrastive loss function to obtain the sampling probability of the positive sample comprises:

sampling the prediction situational label data according to the corresponding optimal loss in the predictive contrastive loss function to obtain the following sampling probability of the positive sample:

$$p(d=i \mid S, c_t) = \frac{p(s_i|c_t)\prod_{l \neq i} p(s_l)}{\sum_{j=1}^{N} p(s_j|c_t)\prod_{l \neq j} p(s_l)} = \frac{\frac{p(s_i|c_t)}{p(s_i)}}{\sum_{j=1}^{N} \frac{p(s_j|c_t)}{p(s_j)}}$$

wherein i denotes a serial number of the positive sample, j denotes a serial number of the negative sample, N denotes a total number of negative samples, $p(s_i|c_t)$ denotes a joint distribution probability of situational information $s_i$ in the positive sample and the temporal coding information $c_t$ at the current moment, $p(s_i)$ denotes an occurrence probability of the situational information $s_i$ in the positive sample, $p(s_j|c_t)$ denotes a joint distribution probability of situational information $s_j$ in the negative sample and the temporal coding information $c_t$ at the current moment, and $p(s_j)$ denotes an occurrence probability of situational information $s_j$ in the negative sample.

7. The predictive contrastive representation method according to claim 6, wherein the direct proportion property between the sampling probability and the similarity is:

$$f_k(s_{t+k}, c_t) \propto \frac{p(s_{t+k}|c_t)}{p(s_{t+k})}$$

wherein $p(s_{t+k}|c_t)$ denotes a joint distribution probability of the future situational information $s_{t+k}$ and the temporal coding information $c_t$ at the current moment, and $p(s_{t+k})$ denotes an occurrence probability of the future situational information $s_{t+k}$.

8. The predictive contrastive representation method according to claim 7, wherein the step of optimizing the predictive contrastive loss function by using the direct proportion property between the sampling probability and the similarity to obtain the optimized predictive contrastive loss function comprises:

optimizing the predictive contrastive loss function by using the direct proportion property between the sampling probability and the similarity to obtain the following optimized predictive contrastive loss function:

$$L_N^{opt} = -\underset{S}{E}\log\left[\frac{\frac{p(s_{t+k}|c_t)}{p(s_{t+k})}}{\frac{p(s_{t+k}|c_t)}{p(s_{t+k})} + \sum_{s_j \in S_{neg}} \frac{p(s_j|c_t)}{p(s_j)}}\right]$$

-continued $$= \underset{S}{E}\log\left[1 + \frac{p(s_{t+k})}{p(s_{t+k}|c_t)} \sum_{s_j \in S_{neg}} \frac{p(s_j|c_t)}{p(s_j)}\right]$$

$$\approx \underset{S}{E}\log\left[1 + \frac{p(s_{t+k})}{p(s_{t+k}|c_t)}(N-1)\underset{s_j}{E}\frac{p(s_j|c_t)}{p(s_j)}\right]$$

$$= \underset{S}{E}\log\left[1 + \frac{p(s_{t+k})}{p(s_{t+k}|c_t)}(N-1)\right]$$

$$\geq \underset{S}{E}\log\left[\frac{p(s_{t+k})}{p(s_{t+k}|c_t)}N\right]$$

$$= -I(s_{t+k}, c_t) + \log(N)$$

wherein $s_{neg}$ denotes a set of negative samples, and $I(s_{t+k}, c_t)$ denotes the mutual information between the temporal coding information at the current moment and the future situational information.

9. The predictive contrastive representation method according to claim 8, wherein the step of constructing the mutual information between the temporal coding information at the current moment and the future situational information based on the optimized predictive contrastive loss function comprises:

constructing the following mutual information between the temporal coding information at the current moment and the future situational information based on the optimized predictive contrastive loss function:

$$I(s_{t+k}, c_t) \geq \log(N) - L_N^{opt}.$$

* * * * *